United States Patent
Brown et al.

(10) Patent No.: US 9,001,058 B2
(45) Date of Patent: Apr. 7, 2015

(54) COMPUTER ACTION DETECTION

(75) Inventors: Kevin C. Brown, Eastleigh (GB); Edward G. Jellard, Southampton (GB); Jonathan Limburn, Southampton (GB)

(73) Assignee: International Business Machines Corporation, Armonk, NY (US)

( * ) Notice: Subject to any disclaimer, the term of this patent is extended or adjusted under 35 U.S.C. 154(b) by 227 days.

(21) Appl. No.: 13/411,942

(22) Filed: Mar. 5, 2012

(65) Prior Publication Data

US 2013/0229361 A1  Sep. 5, 2013

(51) Int. Cl.
*G06F 3/041* (2006.01)
*G06F 3/0488* (2013.01)

(52) U.S. Cl.
CPC .................... *G06F 3/0488* (2013.01)

(58) Field of Classification Search
None
See application file for complete search history.

(56) References Cited

U.S. PATENT DOCUMENTS

| | | | |
|---|---|---|---|
| 6,154,214 A * | 11/2000 | Uyehara et al. | 715/863 |
| 6,856,259 B1 | 2/2005 | Sharp | |
| 7,663,607 B2 | 2/2010 | Hotelling et al. | |
| 7,835,999 B2 | 11/2010 | Block | |
| 8,013,839 B2 | 9/2011 | Ording et al. | |
| 2006/0197750 A1* | 9/2006 | Kerr et al. | 345/173 |
| 2007/0097096 A1 | 5/2007 | Rosenberg | |
| 2007/0247435 A1 | 10/2007 | Benko et al. | |
| 2010/0013780 A1* | 1/2010 | Ikeda et al. | 345/173 |
| 2010/0045627 A1 | 2/2010 | Kennedy | |
| 2010/0085317 A1* | 4/2010 | Park et al. | 345/173 |
| 2010/0134423 A1* | 6/2010 | Brisebois et al. | 345/173 |
| 2010/0299594 A1* | 11/2010 | Zalewski et al. | 715/702 |
| 2011/0115745 A1 | 5/2011 | Cabrera Cordon et al. | |
| 2011/0169762 A1 | 7/2011 | Weiss | |
| 2013/0201155 A1* | 8/2013 | Wu et al. | 345/174 |

OTHER PUBLICATIONS

Humphries, Matthew. "iPad & iPhone tactile object recognition system bodes well for board games—Cell Phones & Mobile Device Technology News & Updates | Geek.com". [online] Published on: Aug. 27, 2010. Retrieved on: Apr. 16, 2012. Retrieved from the Internet: <URL:http://www.geek.com/articles/mobile/ipad-iphone-tactile-object-recognition-system-bodes-well-for-board-games-20100827/>.

Askzy. "How could I get raw touch screen data". In Android-Developers@googlegroups.com. Discuss developing Android applications using the Android framework. ( ). [online] Gmane. [retrieved on: Oct. 26, 2011]. Retrieved from the internet <URL:http://comments.gmane.org/gmane.comp.handhelds.android.devel/124684>.

Benko, Hrvoje et al. "Precise Selection Techniques for Multi-Touch Screens". CHI 2006. Apr. 22-28, 2006. Montreal, Quebec, Canada. Copyright 2006 ACM. <URL:http://dl.acm.org/citation.cfm?id=1124963>.

Concepts and Widgets for a Pressure Sensitive Multi-Touch Pad. Submitted for review to CHI 2009. <URL:http://cims.nyu.edu/~mk2845/PressureWidgetNoPalmDash.pdf>.

(Continued)

*Primary Examiner* — David D Davis
(74) *Attorney, Agent, or Firm* — Edward J. Wixted, III; Nicholas L. Cadmus (57) ABSTRACT

A tool for performing a computer action based on a user's touch on a touch screen. The user's touch is characterized by certain parameters which are compared to predefined parameters which correspond to the hand that was used to touch the screen and a specific computer action. If the parameters match, within a specific error tolerance, the computer action is performed.

12 Claims, 7 Drawing Sheets

(56) References Cited

OTHER PUBLICATIONS

Kaeser, Dominik. "Efficient Multiscale Interaction on Multi-Touch Screens". Jul. 15, 2010.

Smus, Boris. "HTML5 Rocks-Developing for Multi-Touch Web Browsers". Apr. 8, 2011. [online]. [retrieved on Oct. 26, 2011]. Retrieved from the internet <URL: http://www.html5rocks.com/en/mobile/touch.html>. Creative Commons Attribution 3.0 License. Apache 2.0 License.

"Touch—Blackberry HTML5/WebWorks". [online]. [retrieved on Oct. 26, 2011]. Retrieved from the internet <https://bdsc.webapps.blackberry.com/html5/api/Touch.html>. Copyright 2011 Research in Motion Limited.

"Touch Events version 2". W3C Editor's Draft. [online]. [retrieved on: Oct. 10, 2011]. Retrieved from the internet <URL: https://dvcs.w3.org/hg/webevents/raw-file/tip/touchevents.html>. Copyright 2011 W3C.

Wang, Feng et al. "Detecting and Leveraging Finger Orientation for Interaction with Direct-Touch Surfaces". UIST'09, Oct. 4-7, 2009, Victoria, British Columbia, Canada. Copyright 2009 ACM.

\* cited by examiner

COMPUTER ACTION DETECTION

TECHNICAL FIELD

The present invention relates generally to user input on a computing device, and more specifically to associating a user input on a touch screen with a specific computer action.

BACKGROUND

Portable computing devices such as smart phones, tablet computers, and satellite navigation systems are becoming more prevalent. Comprehensive applications are being created to utilize the capabilities of these portable computing devices. Portable computing devices typically include a touch screen and a multitude of other sensors that allow for interaction between a user and the device.

Touch screens allow a user to make selections or move a cursor by touching the touch screen via a finger or stylus. In general, touch screens can recognize the size, shape and position of the touch and output this information to a host device. The host device may be a handheld computer, tablet computer, or smart phone. Some touch screens recognize single touches, while others can recognize multiple, simultaneous touches.

Touch screens typically include a touch panel, a display screen, and a controller. The touch panel is a clear panel with a touch sensitive surface. The touch panel is positioned in front of the display screen so that the touch sensitive surface covers the viewable area of the display screen. The touch panel registers touches and sends these signals to the controller. The controller processes these signals into data and sends the data to the host device. Any device that houses a touch screen generally provides an Application Programming Interface (API) that programs can call to utilize the data.

Proximity sensors are one type of sensor that can be included on a portable computing device to allow for user interaction with the device. For example, a proximity sensor can detect if a user is touching, or is close to touching the proximity sensor. The maximum distance that a proximity sensor can detect is defined as the "nominal range." The "nominal range" is sensor-specific and may be adjustable. Generally, data from a proximity sensor is accessed through an API provided with the portable computing device. The data is typically a Boolean value (yes or no) indicating whether the user is within the "nominal range" of the sensor.

Accelerometers and gyroscopes are other types of sensors that can be included on a portable computing device. Accelerometers and gyroscopes can allow a user to interact with the portable computing device by tilting, rotating, or otherwise moving the device. Accelerometers can detect a device's linear acceleration along the x, y and z axes. Gyroscopes can detect a device's angular acceleration around the x, y and z axes permitting precise calculation of pitch, yaw and roll. In general, data from an accelerometer and a gyroscope can be accessed by a program calling an API that is provided with the portable computing device. The data can be raw data from the sensors or data processed by the host device in the form of information regarding the position, rotation rate, direction of gravity, and acceleration of the portable computing device.

SUMMARY

Aspects of an embodiment of the present invention disclose a method, system, and a program product for performing a computer action based on a user input on a touch screen of a computer. The method comprises a computer receiving the user input on the touch screen and determining the parameters characterizing the user input. The method further comprises the computer determining which hand was used to enter the user input. The method further comprises the computer determining that the parameters characterizing the user input match predefined parameters corresponding to the hand used to enter the user input and a specific computer action, within a specific error tolerance. The method further comprises the computer performing the specific computer action.

DETAILED DESCRIPTION

Figure 1:
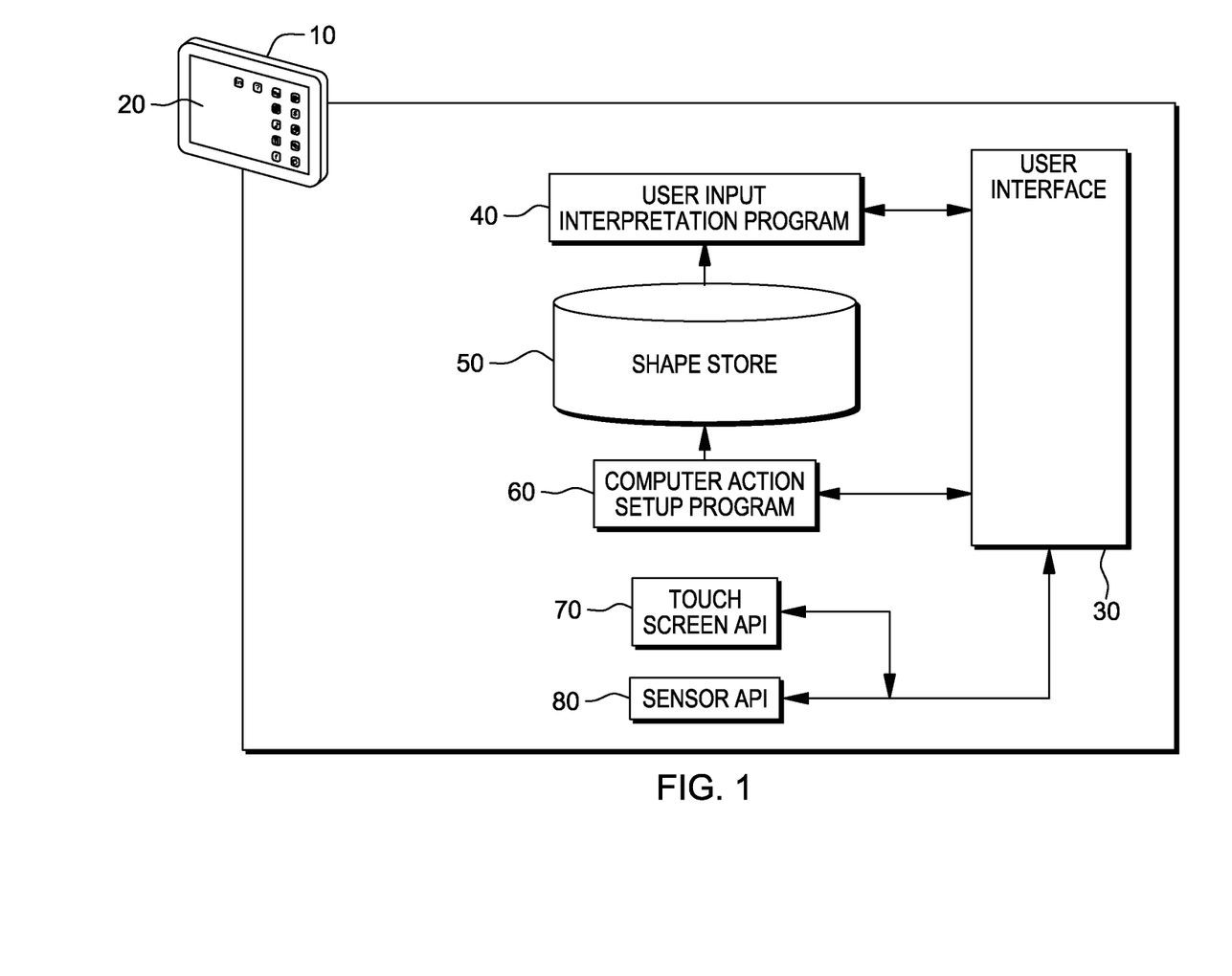
FIG. 1 depicts a diagram of a computing system in accordance with one embodiment of the present invention.

The present invention will now be described in detail with reference to the figures. FIG. 1 depicts a diagram of a computing system 10 in accordance with one embodiment of the present invention. FIG. 1 provides only an illustration of one embodiment and does not imply any limitations with regard to the environments in which different embodiments may be implemented.

In the depicted embodiment, computing system 10 is a handheld computing device such as a tablet computer, personal digital assistant (PDA), smart phone or a satellite navigation system. In general, computing system 10 may be any handheld electronic device capable of accepting user input on touch screen 20 and executing computer program instructions. Computing system 10 includes touch screen 20, user interface 30, user input interpretation program 40, shape store 50, computer action setup program 60, touch screen API 70, and sensor API 80.

Figure 4:
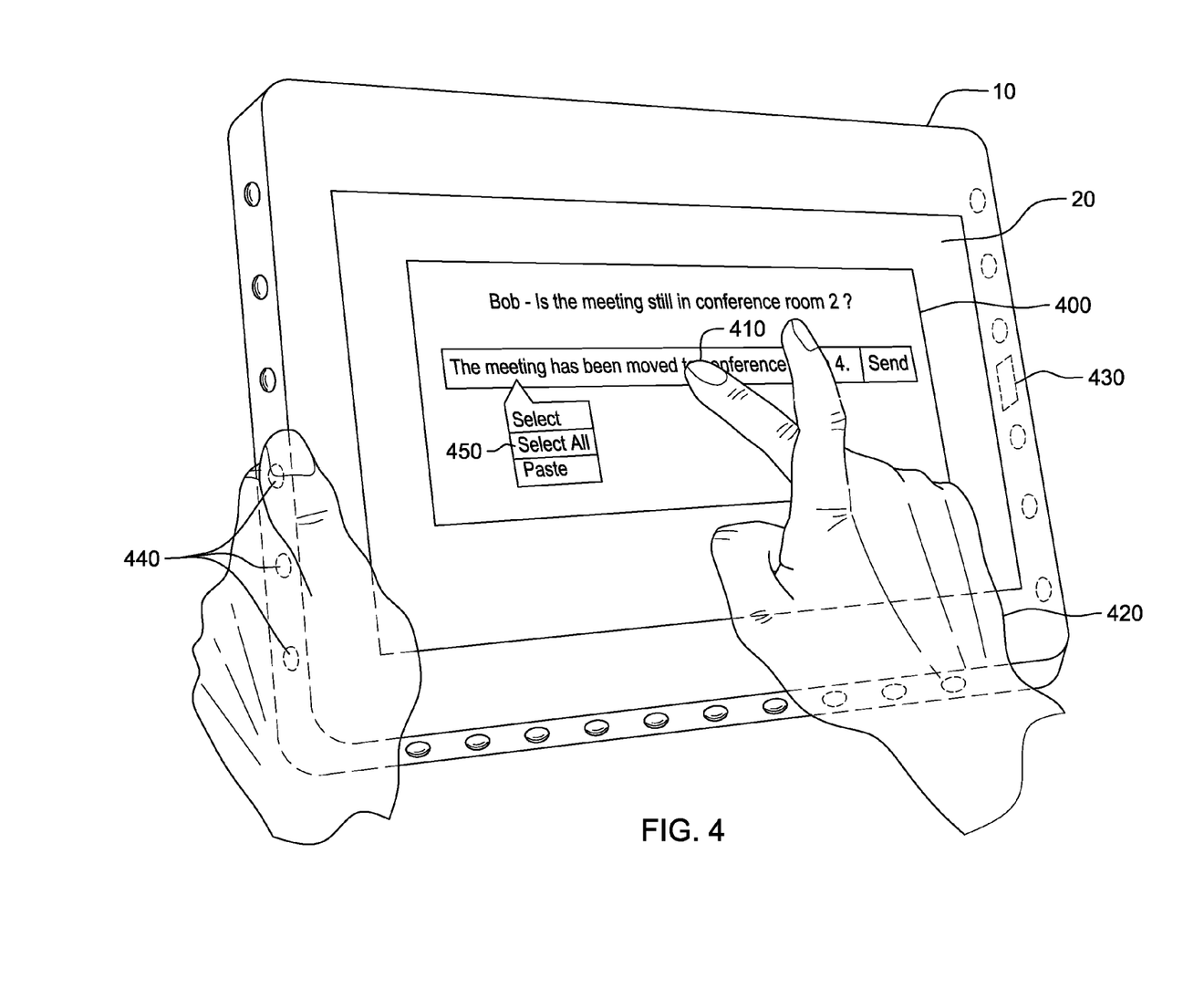
FIG. 4 is an exemplary user interface included in the computer system of FIG. 1 in accordance with one embodiment of the present invention.

Computing system 10 also includes a plurality of proximity sensors integrated around the edge of the computing system as shown in FIG. 4. The plurality of proximity sensors are configured to detect if a user is touching the sensors. Generally, data from the plurality of proximity sensors is accessed by a program calling an Application Programming Interface (API), sensor API 80, provided with computing system 10. The data is typically a Boolean value (yes or no) indicating whether the user is touching the sensor.

Computing system 10 also includes, along with the plurality of proximity sensors, a gyroscope and an accelerometer (not shown) integrated with the computing system. The gyroscope and accelerometer are configured to detect the linear acceleration and angular acceleration around the x, y and z axes of computing system 10 and to send data to the computing system. Generally, data from the gyroscope and the accelerometer can be accessed by a program calling an API, sensor API 80, provided with computing system 10. The data can be raw data from the sensors or data processed by the host device in the form of information regarding the position, rotation rate, direction of gravity, and acceleration of the portable computing device.

Touch screen 20 is integrated with computing system 10. Touch screen 20 is configured to receive input from a user's touch and to send parameters characterizing the input from the user's touch to computing system 10. Generally, the parameters from touch screen 20 can be accessed by a program calling an API, touch screen API 70, provided with computing system 10. The parameters can be raw data from touch screen 20 or information on the size, shape and position of the touch. In one embodiment, the parameter characterizing the input from the user's touch is the shape of the input from the user's touch. The shape of the input from the user's touch can be defined as an ordered list of points describing the path that forms the bounds of the input and/or an ordered list of two-dimensional geometric segments describing the path that forms the bounds of the input. An ordered list of points or segments may be referred to as a polyline.

User interface 30 operates on computing system 10 and works in conjunction with touch screen 20 to visualize content, such as icons and application material, and allows a user to select a specific location on the touch screen. User interface 30 may comprise one or more interfaces such as, an operating system interface and application interfaces. User interface 30 receives the data characterizing the input from the user's touch on touch screen 20 from touch screen API 70 and reports the data to user input interpretation program 40 or computer action setup program 60.

User interface 30 also receives a Boolean value (yes or no) from sensor API 80 for each sensor in the plurality of proximity sensors, indicating whether the user is touching one or more of the sensors during the user's touch on touch screen 20. User interface 30 then reports the Boolean value to user input interpretation program 40 or computer action setup program 60.

User interface 30 also receives gyroscope and accelerometer data from sensor API 80 indicating the computing system's position, rotation rate, direction of gravity, and acceleration during the user's touch on touch screen 20. User interface 30 then reports this information to user input interpretation program 40 or computer action setup program 60.

Computer action setup program 60 operates on computing system 10 to associate specific computer actions with the parameters characterizing input from a user's touch for use with user input interpretation program 40. In one embodiment, the user identifies the specific computer action to set up. For example, the user can choose to define parameters for a right hand-right click which would mimic the right click of a mouse. After the user chooses the computer action, the user will make a desired input on touch screen 20. For example, for a right hand-right click computer action the user may touch the touch screen with the middle finger of their right hand. The parameters of the touch for the right hand-right click computer action are then stored for use with user input interpretation program 40. In one embodiment, the parameter characterizing the input from the user's touch is the shape of the input from the user's touch and the shape of the input is stored in shape store 50.

In another embodiment, computer action setup program 60 operates on computing system 10 to associate specific computer actions with the parameters characterizing an input from a user's touch for use with user input interpretation program 40. In one embodiment, the user identifies the specific computer action to set up. For example, the user can choose to define parameters for a right hand-right "click" which with computing system 10 at a certain position would mimic the right click of a mouse. After the user chooses the computer action, the user will make a desired input on touch screen 20 with computing system 10 at the certain position (see FIG. 3).

Shape store 50 is a file that may be written to by computer action setup program 60 and read by user input interpretation program 40. Shape store 50 operates to store the shape of the input from the user's touch on touch screen 20 received from computer action setup program 60. In other embodiments, shape store 50 may be a database such as an Oracle® database or an IBM® DB2® database.

User input interpretation program 40 operates on computing system 10 to perform a computer action based on input from a user's touch on touch screen 20 and which hand was used to enter the user's touch. In other embodiments, other body parts such as a foot, may be used to enter the user's touch on touch screen 20.

Figure 2:
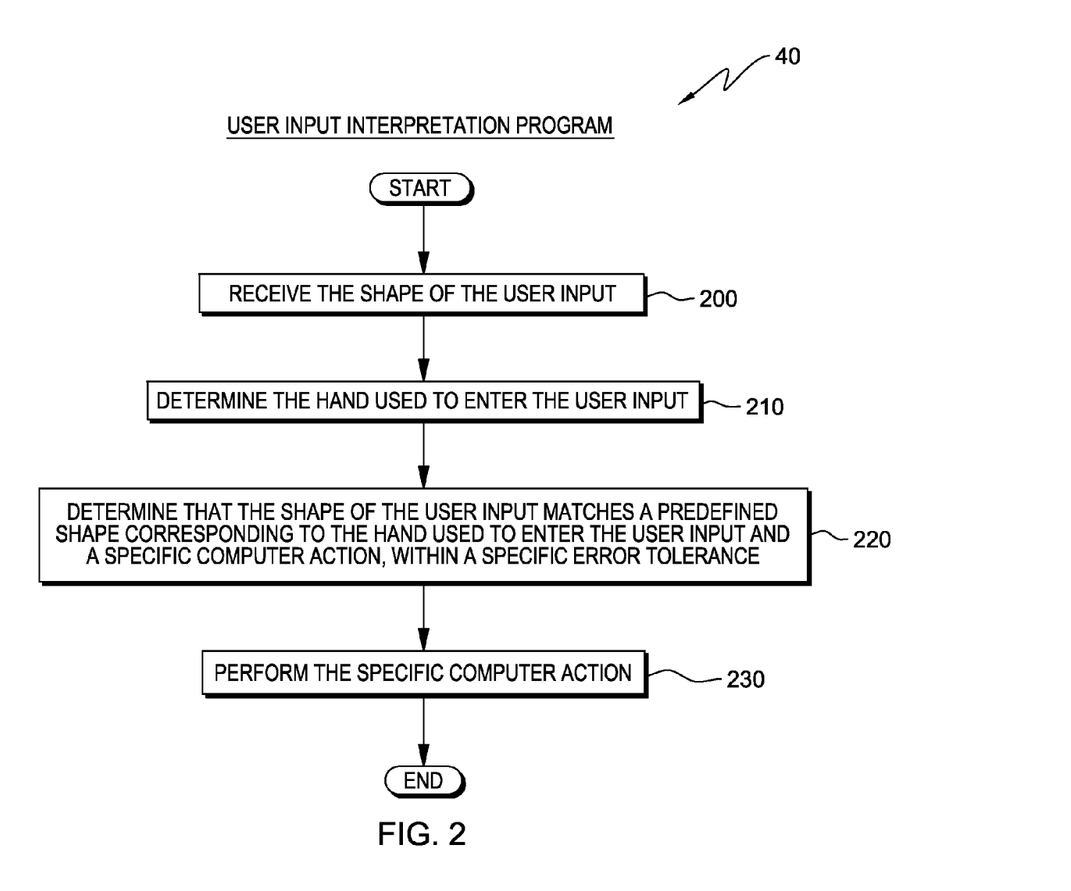
FIG. 2 depicts a flowchart of the steps a user input interpretation program executes within the computing system of FIG. 1 in accordance with one embodiment of the present invention.

FIG. 2 depicts a flowchart of the steps user input interpretation program 40 executes within the computing system of FIG. 1, for performing a computer action based on a user input on a touch screen of a computing system in accordance with one embodiment of the present invention.

In step 200, user input interpretation program 40 receives, from user interface 30, the shape of the input from the user's touch on touch screen 20. The shape of the input from the user's touch can be defined as an ordered list of points describing the path that forms the bounds of the input and/or an ordered list of two-dimensional geometric segments describing the path that forms the bounds of the input. An ordered list of points or segments may be referred to as a polyline.

User input interpretation program 40 determines the hand used to enter the user input on touch screen 20 (step 210). In one embodiment, user input interpretation program 40 receives, from user interface 30, a Boolean value (yes or no) for each sensor in the plurality of proximity sensors, indicating whether the user is touching the sensor during the user's touch on touch screen 20. User input interpretation program 40 also receives, from user interface 30, an indication of the orientation of computing system 10 during the user's touch on touch screen 20. The orientation of computing system 10 can be described as portrait, portrait upside down, landscape left, or landscape right. Generally, a computing system will have a standard top edge designated by a button or a headphone jack that is used as a reference when describing other orientations of the computing system. A standard bottom edge corresponds to the edge opposite to the standard top edge.

User input interpretation program 40 determines the hand used to enter the user input on touch screen 20 using the information received from user interface 30. For example, if computing system 10 has an orientation of landscape right (the standard top of the computing system is to the right) and one or more proximity sensors on the standard bottom edge of the computing system have a Boolean value of yes, user input interpretation program 40 determines that the right hand entered the user input on touch screen 20 (see FIG. 4).

In step 220, user input interpretation program 40 determines that the shape of the input from the user's touch on touch screen 20 matches a predefined shape corresponding to the hand used to enter the user input and a specific computer action, within a specific error tolerance. The specific error tolerance can be determined by multiple samples of the shape of the user's touch on touch screen 20 during multiple iterations of the set up process, shown in FIG. 5, for a specific computer action. The multiple samples set a range of acceptable shapes. The shape of the input from the user's touch must be within this acceptable range. In one embodiment, user input interpretation program 40 queries shape store 50 to fetch the predefined shapes corresponding to the hand used to enter the user input. For example, if user input interpretation program 40 determines that the right hand enters the user input on touch screen 20 the user input interpretation program queries shape store 50 and fetches the predefined shapes corresponding to the right hand for comparison.

If user input interpretation program 40 determines that the shape of the input from the user's touch on touch screen 20 matches a predefined shape corresponding to the hand used to enter the user input and a specific computer action, within a specific error tolerance, then user input interpretation program 40 performs the specific computer action (step 230).

Figure 3:
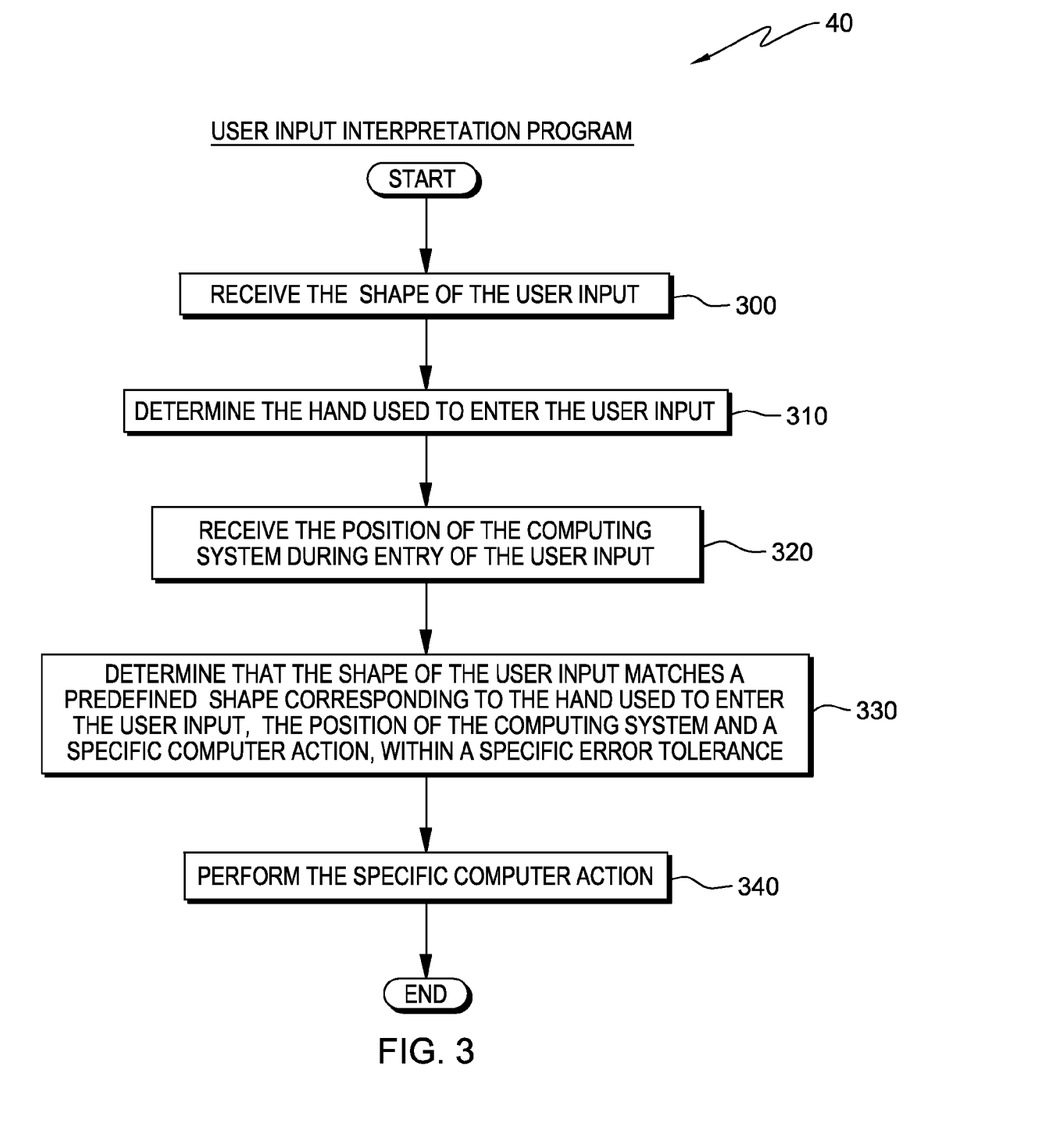
FIG. 3 depicts a flowchart of the steps a user input interpretation program executes within the computing system of FIG. 1 in accordance with another embodiment of the present invention.

FIG. 3 depicts a flowchart of the steps user input interpretation program 40 executes within the computing system of FIG. 1, for performing a computer action based on a user input on a touch screen of the computing system in accordance with another embodiment of the present invention.

Figure 7:
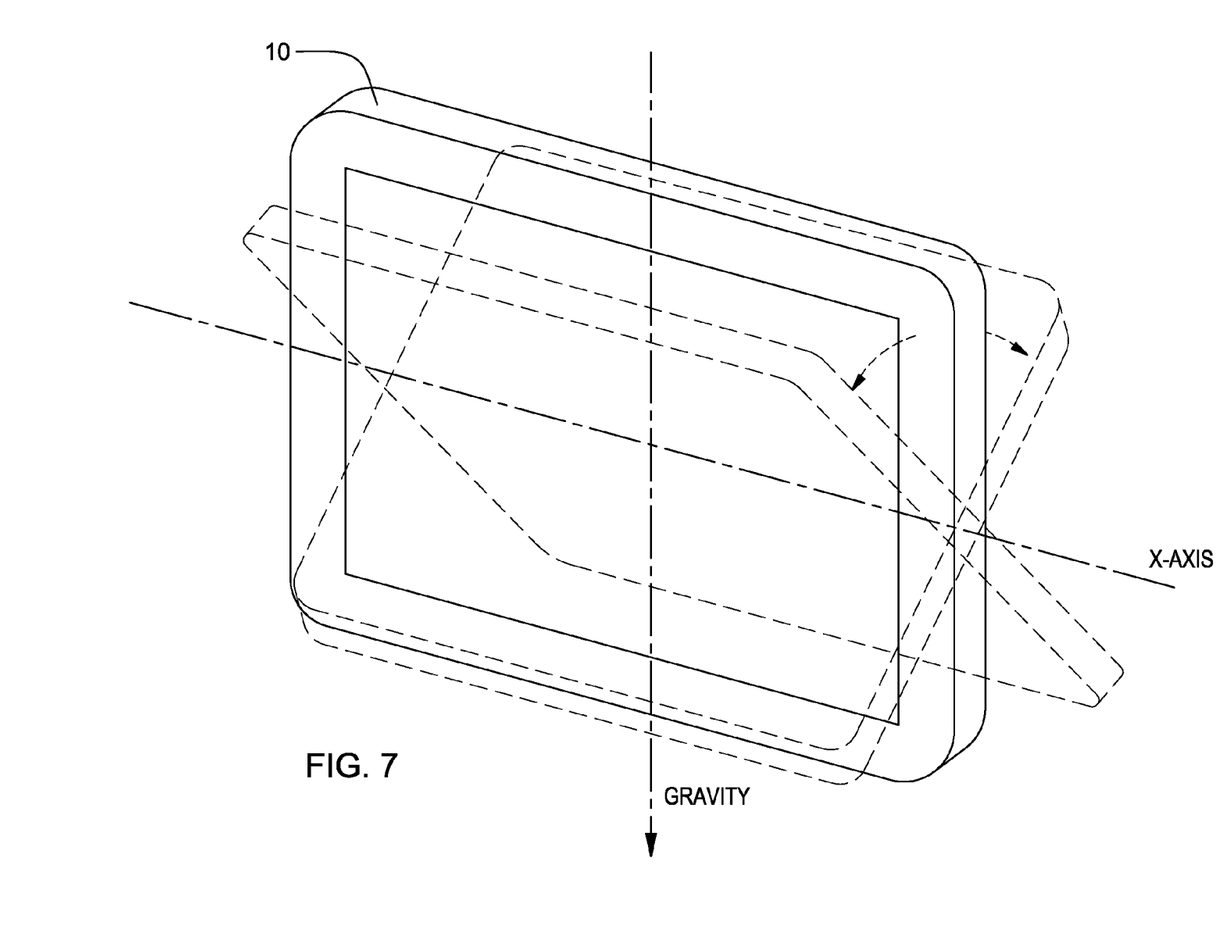
FIG. 7 depicts a computing system with an x-axis passing through the computing system from side to side with respect to gravity in accordance with one embodiment of the present invention.

Step 300 and step 310 are equivalent to step 200 and step 210 in FIG. 2. User input interpretation program 40 receives data describing the position of computing system 10 during the user's touch on touch screen 20 (step 320). In one embodiment, the data describing the position of computing system 10, during the user's touch on touch screen 20 received by user input interpretation program 40, from user interface 30, is data from a gyroscope and accelerometer in the form of the angle of rotation around the x-axis, with respect to gravity. In one embodiment, the x-axis passes through computing system 10 from side to side as shown in FIG. 7.

In step 330, user input interpretation program 40 determines that the shape of the input from the user's touch on touch screen 20 matches a predefined shape corresponding to the hand used to enter the user input, the data describing the position of computing system 10 and a specific computer action, within a specific error tolerance. In one embodiment, user input interpretation program 40 queries shape store 50 to fetch the predefined shapes corresponding to the hand used to enter the user input and the data describing the position of computing system 10. For example, if user input interpretation program 40 determines that the right hand entered the user input on touch screen 20 and it receives an angle of rotation where the top of computing system 10 is rotated 15 degrees away from the user during entry of the user input, then the user input interpretation program queries shape store 50 and fetches the predefined shapes corresponding to the right hand and the angle of rotation of 15 degrees away from the user for comparison.

If user input interpretation program 40 determines that the shape of the input from the user's touch on touch screen 20 matches a predefined shape corresponding to the hand used to enter the user input, the data describing the position of computing system 10 and a specific computer action, within a specific error tolerance, then user input interpretation program 40 performs the specific computer action (step 340).

FIG. 4 is an exemplary interface to computing system 10 running user input interpretation program 40, in accordance with one embodiment of the present invention. Computing system 10 is displaying an example of user interface program 400 on touch screen 20. User interface program 400 is a chat program for communicating with another user on another computing system. The user inputs touch 410 on touch screen 20 using right hand 420. Computing system 10 is in the landscape right orientation with power button 430 facing to the right, and the user is in contact with proximity sensors 440 on the standard bottom edge of the computing system.

Given that computing system 10 is in landscape right orientation and the user is in contact with proximity sensors 440 during touch 410, user input interpretation program 40 determines the user's right hand 420 was used to input touch 410. User input interpretation program 40 fetches predefined shapes that correspond to the user's right hand 420 and a specific computer action, and determines if the shape of touch 410 matches a predefined shape. In this example, the shape of touch 410 matched the predefined shape corresponding to the user's right hand 420 and the specific computer action of a right click.

Because the shape of touch 410 matched the predefined shape corresponding to the user's right hand 420 and the specific computer action of a right click, user input interpretation program 40 proceeds with instructions of the right click. The instructions of the right click indicate to computing system 10 that a right click is being inputted by the user. In this example, a right click in user interface 400 displays a right click menu 450 with different actions the user may select.

Figure 5:
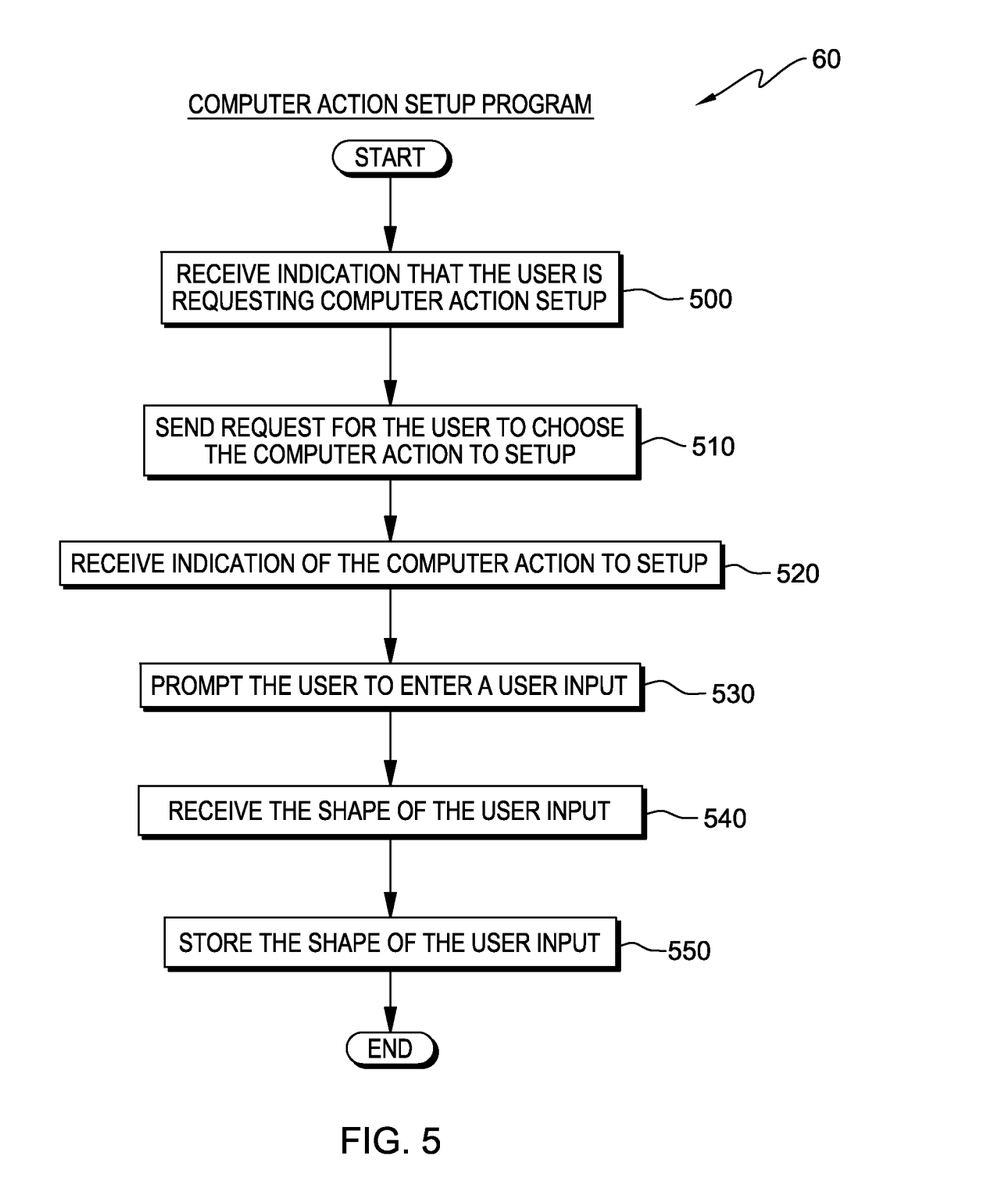
FIG. 5 depicts a flowchart of the steps a computer action setup program executes within the computing system of FIG. 1 in accordance with one embodiment of the present invention.

FIG. 5 depicts a flowchart of the steps of computer action setup program 60 for receiving and storing parameters, characterizing the user input on touch screen 20, in accordance with one embodiment of the present invention.

In step 500, computer action setup program 60 receives, from user interface 30, an indication that the user is requesting setup of a computer action. In one embodiment, step 500 involves the user selecting a computer action setup function in user interface 30, upon which the user interface sends the indication to computer action setup program 60.

In response to receiving the indication of the computer action setup request, computer action setup program 60 sends user interface 30 a request for the user to choose the computer action to set up (step 510). User interface 30 displays on touch screen 20 a list of specific computer actions available for set up. Custom actions can be entered by the user for use with certain programs. For example, the user can choose to define parameters for a right hand-right click computer action which mimic the right click of a mouse by selecting that computer action from the list displayed on touch screen 20.

Computer action setup program 60 receives, from user interface 30, an indication of the computer action the user selected to set up (step 520). In response to receiving the indication of the computer action selected to set up, computer action setup program 60 sends, to user interface 30, a prompt for the user to enter a user input on touch screen 20 (step 530). For example, for a right hand-right click computer action the user may touch touch screen 20 with the middle finger of their right hand.

In step 540, computer action setup program 60 receives, from user interface 30, the parameters, characterizing the user input on touch screen 20, corresponding to the hand used to enter the user input and a specific computer action. In one embodiment, the parameter characterizing the user input is the shape of the input from the user's touch as discussed previously. For example, the shape of the user input for the right hand-right click computer action is the shape of the part of the middle finger of the user in contact with touch screen 20.

Computer action setup program 60 stores the shape of the user input on touch screen 20 corresponding to the hand used to enter the user input and a specific computer action in shape store 50 (step 550). User input interpretation program 40 may access the stored shapes when carrying out step 220 of FIG. 2 and step 330 of FIG. 3.

Figure 6:
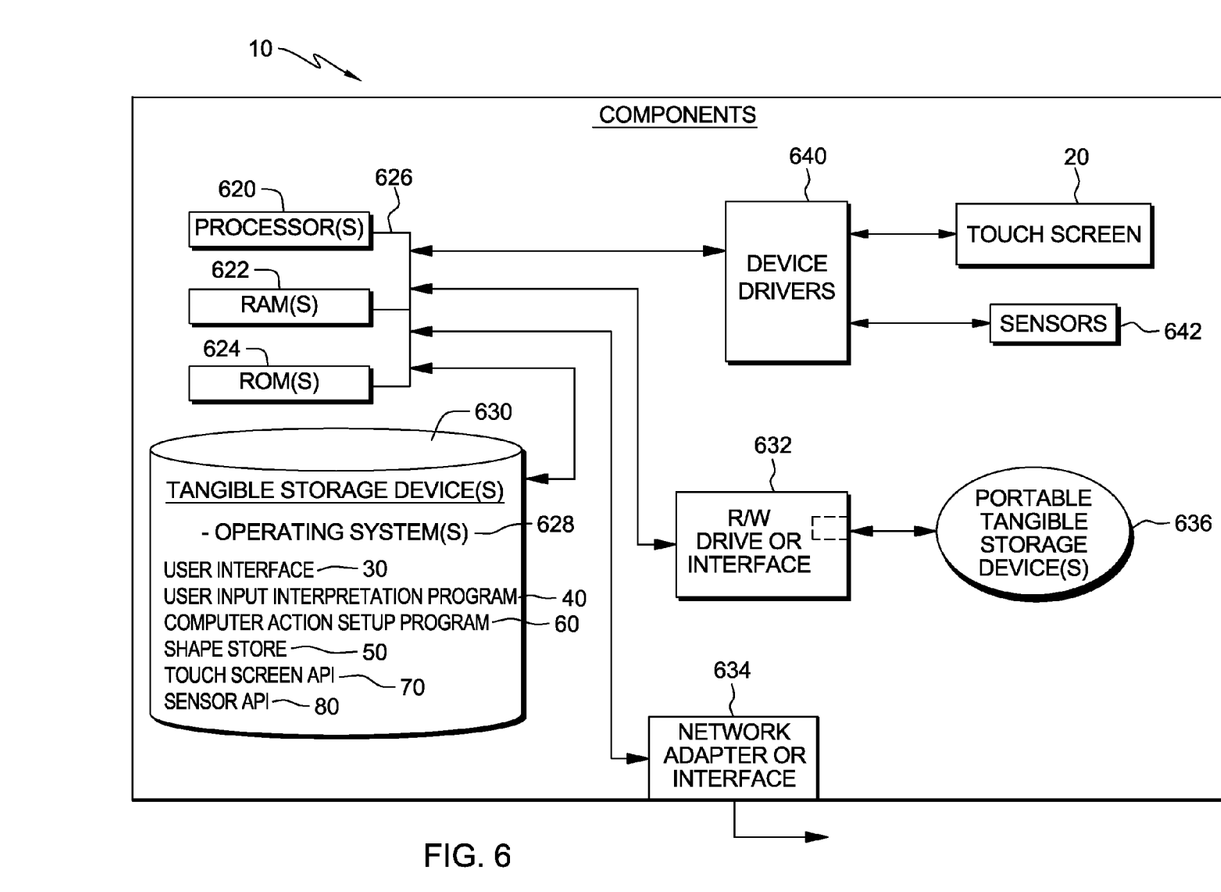
FIG. 6 is a block diagram of the components utilized by the computing system of FIG. 1 in accordance with one embodiment of the present invention.

FIG. 6 is a block diagram of components utilized by computing system 10 of FIG. 1 in accordance with one embodiment of the present invention.

Computing system 10 includes one or more processors 620, one or more computer-readable RAMs 622 and one or more computer-readable ROMs 624 on one or more buses 626, and one or more operating systems 628 and one or more computer-readable tangible storage devices 630. The one or more operating systems 628, user interface 30, user input interpretation program 40, computer action setup program 60, shape store 50, touch screen API 70, and sensor API 80 are stored on one or more of computer-readable tangible storage devices 630 for execution by one or more of processors 620 via one or more of RAMs 622 (which typically include cache memory). In the embodiment illustrated in FIG. 6, each of the computer-readable tangible storage devices 630 is a magnetic disk storage device of an internal hard drive. Alternatively, each of the computer-readable tangible storage devices 630 is a semiconductor storage device such as ROM 624, EPROM, flash memory or any other computer-readable tangible storage device that can store a computer program and digital information.

Computing system 10 also includes a R/W drive or interface 632 to read from and write to one or more portable computer-readable tangible storage devices 636 such as a CD-ROM, DVD, memory stick, magnetic tape, magnetic disk, optical disk or semiconductor storage device. User interface 30, user input interpretation program 40, computer action setup program 60, shape store 50, touch screen API 70, and sensor API 80 can be stored on one or more of portable computer-readable tangible storage devices 636, read via R/W drive or interface 632 and loaded into hard drive 630.

Computing system 10 also includes a network adapter or interface 634 such as a TCP/IP adapter card. User interface 30, user input interpretation program 40, computer action setup program 60, shape store 50, touch screen API 70, and sensor API 80 can be downloaded to computing system 10 from an external computer via a network and network adapter or interface 634. From the network adapter or interface 634, user interface 30, user input interpretation program 40, computer action setup program 60, shape store 50, touch screen API 70, and sensor API 80 are loaded into hard drive 630. The network may comprise copper wires, optical fibers, wireless transmission, routers, firewalls, switches, gateway computers and/or edge servers.

Computing system 10 includes a touch screen 20 and sensors 642. Sensors 642 includes a gyroscope, an accelerometer and a plurality of proximity sensors. Also included in computing system 10 are device drivers 640 to interface to touch screen 20 and sensors 642. The device drivers 640, R/W drive or interface 632 and network adapter or interface 634 comprise hardware and software (stored in storage device 630 and/or ROM 624).

User interface 30, user input interpretation program 40, computer action setup program 60, shape store 50, touch screen API 70, and sensor API 80 can be written in various programming languages (such as Java, C++) including low-level, high-level, object-oriented or non object-oriented languages. Alternatively, the functions of user interface 30, user input interpretation program 40, computer action setup program 60, shape store 50, touch screen API 70, and sensor API 80 can be implemented in whole or in part by computer circuits and other hardware (not shown).

Based on the foregoing, a computer system, a method and a program product have been disclosed for performing a computer action based on input from a user's touch on a touch screen. The description above has been presented for illustration purposes only. It is not intended to be an exhaustive description of the possible embodiments. One of ordinary skill in the art will understand that other combinations and embodiments are possible. Therefore, the present invention has been disclosed by way of example and not limitation.

What is claimed is:

1. A method for performing a computer action based on a user input on a touch screen of a computing system, the user input entered by a user by holding the computing system in a right or left hand and touching the touch screen with the other hand, the method comprising the steps of:
   the computing system receiving the user input on the touch screen of the computing system, wherein the touch screen is capable of displaying information;
   the computing system receiving a shape of the user input on the touch screen;
   the computing system determining which hand is used to enter the user input on the touch screen;
   the computing system receiving an angle of rotation of the computing system with respect to gravity during entry of the user input;
   the computing system determining a specific computer action to perform, based on the specific computer action being associated with predefined input parameters corresponding, within a specific error tolerance, to:
      the received shape of the user input on the touch screen,
      the determined hand used to enter the user input on the touch screen, and
      the angle of rotation of the computing system with respect to gravity during entry of the user input on the touch screen; and
   the computing system performing the specific computer action.

2. The method of claim 1, wherein the step of the computing system determining which hand is used to enter the user input on the touch screen, comprises the steps of:
   the computing system receiving an indication, from each sensor in a plurality of sensors on the computing system, whether the user is touching the sensor during the user input on the touch screen, wherein each sensor of the plurality of sensors is a proximity sensor;
   the computing system receiving an indication of the orientation of the computing system during the user input on the touch screen; and
   the computing system determining the hand used to enter the user input on the touch screen.

3. The method of claim 1, wherein the shape of the user input is an ordered list of points describing a path that forms the bounds of the input.

4. The method of claim 1, wherein the shape of the user input is an ordered list of two-dimensional geometric segments describing a path that forms the bounds of the input.

5. A computer program product for performing a computer action based on a user input on a touch screen of a computing system, the user input entered by a user by holding the computing system in a right or left hand and touching the touch screen with the other hand, the computer program product comprising:

one or more computer-readable tangible storage devices and program instructions stored on at least one of the one or more storage devices, the program instructions comprising:

program instructions to receive the user input on the touch screen of the computing system, wherein the touch screen is capable of displaying information;

program instructions to receive a shape of the user input on the touch screen;

program instructions to determine which hand is used to enter the user input on the touch screen;

program instructions to receive an angle of rotation of the computing system with respect to gravity during entry of the user input program instructions to determine a specific computer action to perform, based on the specific computer action being associated with predefined input parameters corresponding, within a specific error tolerance, to:

the received shape of the user input on the touch screen, and the determined hand used to enter the user input on the touch screen; and the angle of rotation of the computing system with respect to gravity during entry of the user input on the touch screen;

program instructions to perform the specific computer action.

6. The computer program product of claim 5, wherein the program instructions to determine which hand is used to enter the user input on the touch screen, comprise program instructions to:

receive an indication, from each sensor in a plurality of sensors on the computing system, whether the user is touching the sensor during the user input on the touch screen, wherein each sensor of the plurality of sensors is a proximity sensor;

receive an indication of the orientation of the computing system during the user input on the touch screen; and determine the hand used to enter the user input on the touch screen.

7. The computer program product of claim 5, wherein the shape of the user input is an ordered list of points describing a path that forms the bounds of the input.

8. The computer program product of claim 5, wherein the shape of the user input is an ordered list of two-dimensional geometric segments describing a path that forms the bounds of the input.

9. A computer system for performing a computer action based on a user input on a touch screen of a computing system, the user input entered by a user by holding the computing system in a right or left hand and touching the touch screen with the other hand, the computer system comprising:

one or more processors, one or more computer-readable memories, one or more computer-readable tangible storage devices and program instructions which are stored on at least one of the one or more storage devices for execution by at least one of the one or more processors via at least one of the one or more memories, the program instructions comprising:

program instructions to receive the user input on the touch screen of the computing system, wherein the touch screen is capable of displaying information;

program instructions to receive a shape of the user input on the touch screen;

program instructions to determine which hand is used to enter the user input on the touch screen;

program instructions to receive an angle of rotation of the computing system with respect to gravity during entry of the user input program instructions to determine a specific computer action to perform, based on the specific computer action being associated with predefined input parameters corresponding, within a specific error tolerance to:

the received shape of the user input on the touch screen, and the determined hand used to enter the user input on the touch screen; and and the angle of rotation of the computing system with respect to gravity during entry of the user input on the touch screen;

program instructions to perform the specific computer action.

10. The computer system of claim 9, wherein the program instructions to determine which hand is used to enter the user input on the touch screen, comprises program instructions to:

receive an indication, from each sensor in a plurality of sensors on the computing system, whether the user is touching the sensor during the user input on the touch screen, wherein each sensor of the plurality of sensors is a proximity sensor;

receive an indication of the orientation of the computing system during the user input on the touch screen; and determine the hand used to enter the user input on the touch screen.

11. The computer system of claim 9, wherein the shape of the user input is an ordered list of points describing a path that forms the bounds of the input.

12. The computer system of claim 9, wherein the shape of the user input is an ordered list of two-dimensional geometric segments describing a path that forms the bounds of the input.

* * * * *